(12) United States Patent
Politick et al.

(10) Patent No.: US 8,311,738 B2
(45) Date of Patent: Nov. 13, 2012

(54) BOOM-MOUNTED MACHINE LOCATING SYSTEM

(75) Inventors: Martin Joseph Nicolas Andre Eric Politick, Laval (CA); Yuri Levchenko, Pierrefonds (CA)

(73) Assignee: Caterpillar Inc., Peoria, IL (US)

( * ) Notice: Subject to any disclaimer, the term of this patent is extended or adjusted under 35 U.S.C. 154(b) by 1617 days.

(21) Appl. No.: 11/411,889

(22) Filed: Apr. 27, 2006

(65) Prior Publication Data

US 2007/0255494 A1 Nov. 1, 2007

(51) Int. Cl.
*G01S 1/00* (2006.01)
*G06F 7/70* (2006.01)

(52) U.S. Cl. ............ 701/469; 701/50; 701/468; 701/470
(58) Field of Classification Search .................... 37/348; 701/50, 213
See application file for complete search history.

(56) References Cited

U.S. PATENT DOCUMENTS

| | | | |
|---|---|---|---|
| 4,769,932 A | 9/1988 | Kalve | |
| 5,144,317 A * | 9/1992 | Duddek et al. | 342/357.27 |
| 5,404,661 A * | 4/1995 | Sahm et al. | 37/348 |
| 5,438,771 A * | 8/1995 | Sahm et al. | 37/348 |
| 5,784,029 A * | 7/1998 | Geier | 701/472 |
| 5,862,501 A | 1/1999 | Talbot et al. | |
| 5,951,613 A | 9/1999 | Sahm et al. | |
| 6,052,647 A * | 4/2000 | Parkinson et al. | 701/23 |
| 6,191,732 B1 * | 2/2001 | Carlson et al. | 342/357.3 |
| 6,191,733 B1 * | 2/2001 | Dizchavez | 342/357.57 |
| 6,711,838 B2 * | 3/2004 | Staub et al. | 37/348 |
| 7,079,931 B2 * | 7/2006 | Sahm et al. | 701/50 |
| 7,139,651 B2 * | 11/2006 | Knowlton et al. | 701/50 |
| 7,472,009 B2 * | 12/2008 | Baldwin | 701/50 |
| 7,532,967 B2 * | 5/2009 | Fujishima et al. | 701/50 |
| 2004/0210371 A1 * | 10/2004 | Adachi et al. | 701/50 |
| 2005/0027420 A1 * | 2/2005 | Fujishima et al. | 701/50 |
| 2005/0080559 A1 * | 4/2005 | Ishibashi et al. | 701/213 |
| 2005/0197755 A1 * | 9/2005 | Knowlton et al. | 701/50 |
| 2006/0085118 A1 * | 4/2006 | Baldwin | 701/50 |

FOREIGN PATENT DOCUMENTS

| | | |
|---|---|---|
| AU | 2004222734 | 1/2006 |
| EP | 0451520 | 10/1991 |
| JP | 6-158645 | 6/1994 |
| JP | 9-267991 | 10/1997 |
| JP | 2001-90101 | 4/2001 |
| JP | 2001-163578 | 6/2001 |
| JP | 6-158645 | 8/2003 |
| JP | 2003-221183 | 8/2003 |
| JP | 2004-169393 | 6/2004 |
| WO | WO 97/46763 | 12/1997 |

* cited by examiner

*Primary Examiner* — Ian Jen
(74) *Attorney, Agent, or Firm* — Finnegan, Henderson, Farabow, Garrett & Dunner LLP

(57) ABSTRACT

A locating system for a machine having a boom is disclosed. The locating system has a first GPS unit and a second GPS unit. The first GPS unit is located on the boom.

16 Claims, 2 Drawing Sheets

BOOM-MOUNTED MACHINE LOCATING SYSTEM

TECHNICAL FIELD

The present disclosure is directed to a machine locating system and, more particularly, to a machine locating system that is at least partially mounted on a boom of the machine.

BACKGROUND

Machines such as, for example, dragline excavators, track type and wheeled hydraulic or electric excavators, cranes, dredging machines, and other load moving machines are typically equipped with a body housing a power source and an operator station; a boom driven by the power source; and a tool connected to the boom. Some of these machines may be very large and complex to operate. In order to optimize production and efficiency of the machine, it may be necessary for the operator of the machine to precisely position and orient the machine and the tool relative to a work site and load. However, because of the size and geometry of the machine, it may be difficult for the operator to accurately know the position or orientation of the machine.

One example of providing the position and orientation of such a machine to an operator of the machine is described in U.S. Pat. No. 6,191,733 (the '733 patent) issued to Dizchavez on Feb. 20, 2001. The '733 patent describes a work machine having two global positioning satellite (GPS) antennae mounted at separate locations on a body of the work machine. The GPS antennae periodically measure their three-dimensional coordinates with respect to a chosen reference system. Based on the coordinates of the GPS antennae and known geometry of the work machine, the position of critical components may be determined irrespective of a specific motion pattern of the machine. This position can then be shown on a monitor within an operator station of the machine, along with a target mining site.

Although the GPS antennae of the '733 patent may sufficiently provide the position of critical components of an associated machine, it may be problematic. In particular, because neither of the GPS antennae is located at a rotational axis of the work machine, the calculations required to determine any location on the work machine away from the GPS antennae may be complex. In addition, because neither of the GPS antennae is located on a boom of the work machine, the location of an associated tool connected to the boom may be unknown. Further, without a GPS antenna being located on the boom, flexing of the boom due to a heavy load may be unaccounted for.

The machine locating system of the present disclosure solves one or more of the problems set forth above.

SUMMARY OF THE DISCLOSURE

In one aspect, the present disclosure is directed to a locating system for a machine having a boom. The locating system includes a first GPS unit. The locating system also includes a second GPS unit located on the boom.

In another aspect, the present disclosure is directed to a locating system for a machine having a gantry member, a boom, a tool, and a cable extending from the gantry member over a tip of the boom to the tool. The locating system includes a first GPS unit disposed on the gantry member. The locating system also includes a second GPS unit.

In another aspect, the present disclosure is directed to a method of locating a machine having a boom. The method includes receiving a first signal indicative of the position of the boom. The method also includes receiving a second signal indicative of the position of a center of rotation of the machine.

DETAILED DESCRIPTION

Figure 1:
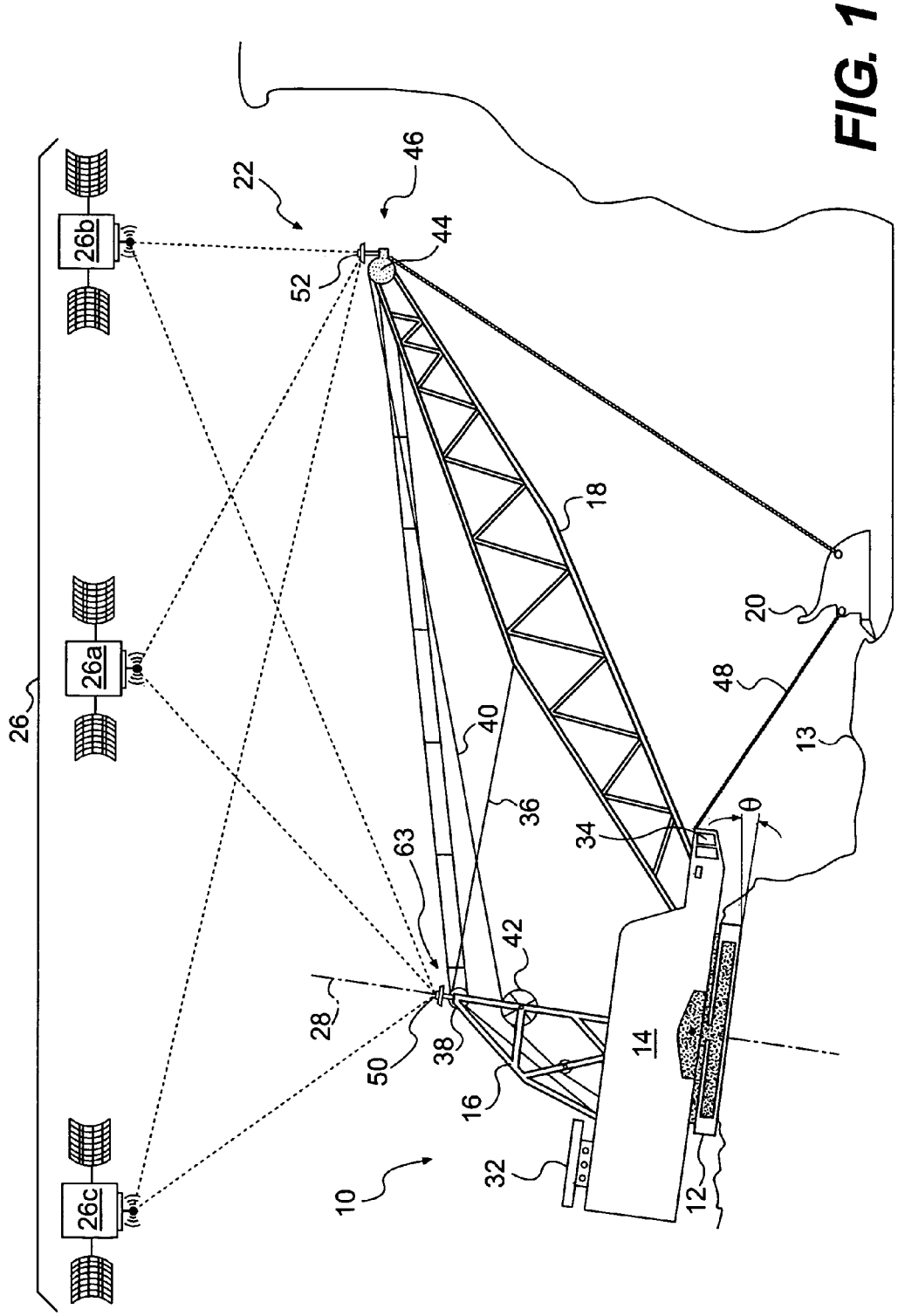
FIG. 1 is a schematic illustration of an exemplary disclosed machine.

FIG. 1 illustrates an exemplary embodiment of a machine 10. Machine 10 may perform some type of operation associated with an industry such as mining, construction, farming, transportation, or any other industry known in the art. For example, machine 10 may embody an earth moving machine such as the dragline machine depicted in FIG. 1, a hydraulic or electric excavator, a crane, or any other similar machine. Machine 10 may include a base 12, a body 14, a gantry member 16, a boom 18, a tool 20, and a locating system 22 in communication with a satellite system 26.

Base 12 may include a structural unit that supports movement of machine 10. Base 12 may embody, for example, a stationary platform configured for engagement with a work surface 13, or a movable frame member having a traction device such as feet, tracks, or wheels.

Body 14 may pivot relative to base 12. Specifically, body 14 may pivot relative to base 12 about a substantially vertical axis 28. As body 14 is pivoted about axis 28, attached gantry member 16, boom 18, and tool 20 may likewise pivot to change a radial engagement angle of tool 20 with work surface 13. Body 14 may house a power source 32 that powers the movement of machine 10.

Gantry member 16 may embody a structural frame member configured to anchor one or more cables to body 14. Gantry member 16 may be disposed at about the same general location as axis 28 and extend from body 14 in a vertical direction relative to base 12. Gantry member 16 may be located rearward of boom 18 relative to tool 20. It is contemplated that gantry member 16 may be either fixedly connected to body 14 or pivotally connected by way of a pin joint (not shown), if desired. One or more cables 36 may extend from gantry member 16 over a pulley mechanism 38 of gantry member 16 to one or more points along a mid portion of boom 18. Ends of cables 36 may attach to gantry member 16 or body 14 by way of one or more motors (not shown) such that a rotation of the motors functions to reel in or spool out cables 36, thereby affecting the vertical angle between boom 18 and work surface 13. For example, when cables 36 are reeled in, the decreasing effective length of cables 36 may cause boom 18 to rise, thereby increasing the vertical angle between boom 18 and work surface 13. In contrast, when cables 36 are spooled out, the increasing effective length of cables 36 may cause boom 18 to lower, thereby decreasing the angle between boom 18 and work surface 13. A sensing device (not shown) may be associated with the motor(s) to determine the effective lengths of cables 36 and thereby the vertical angle between boom 18 and work surface 13.

Boom 18 embody a structural frame member pivotally connected to a front end portion of body 14. One or more cables 40 may extend from tool 20 over a pulley mechanism 44 located at a tip end 46 of boom 18 and over a pulley mechanism 42 of gantry member 16 to body 14. Cables 40 may connect tool 20 to body 14 by way of one or more motors (not shown), such that a rotation of the motors functions to reel in or spool out cables 40, thereby affecting the height of tool 20 relative to work surface 13. For example, when cables 40 are reeled in, the decreasing effective length of cables 40 may cause tool 20 to rise away from work surface 13. In contrast, when cables 40 are spooled out, the increasing effective length of cables 40 may cause tool 20 to lower toward work surface 13. A sensing device (not shown) may be associated with the motor(s) to determine the effective lengths of cables 40, which may be used, in conjunction with the location of tip end 46 of boom 18, to determine a position of tool 20.

Numerous different tools 20 may be attachable to a single machine 10 and controllable via operator station 34. Tool 20 may include any device used to perform a particular task such as, for example, a bucket, a shovel, a grasping device, a cutting device, or any other task-performing device known in the art. Although connected in the disclosed embodiment of FIG. 1 to be lifted and tilted relative to machine 10, tool 20 may alternatively or additionally be rotated, slid, swung, or moved in any other manner known in the art. One or more cables 48 may connect tool 20 to body 14 by way of one or more motors (not shown), such that a rotation of the motors functions to reel in or spool out cables 48. For example, when cables 48 are reeled in, the decreasing effective length of cables 48 may cause tool 20 to move toward body 14. In contrast, when cables 48 are spooled out, the increasing effective length of cables 48 may allow gravity to draw tool 20 way from body 14 toward a substantially vertical position relative to tip end 46 of boom 18. A sensing device (not shown) may be associated with the motor(s) to determine the effective lengths of cables 48 and, along with the effective length of cables 48 and position of tip end 46, the location of tool 20.

Figure 2:
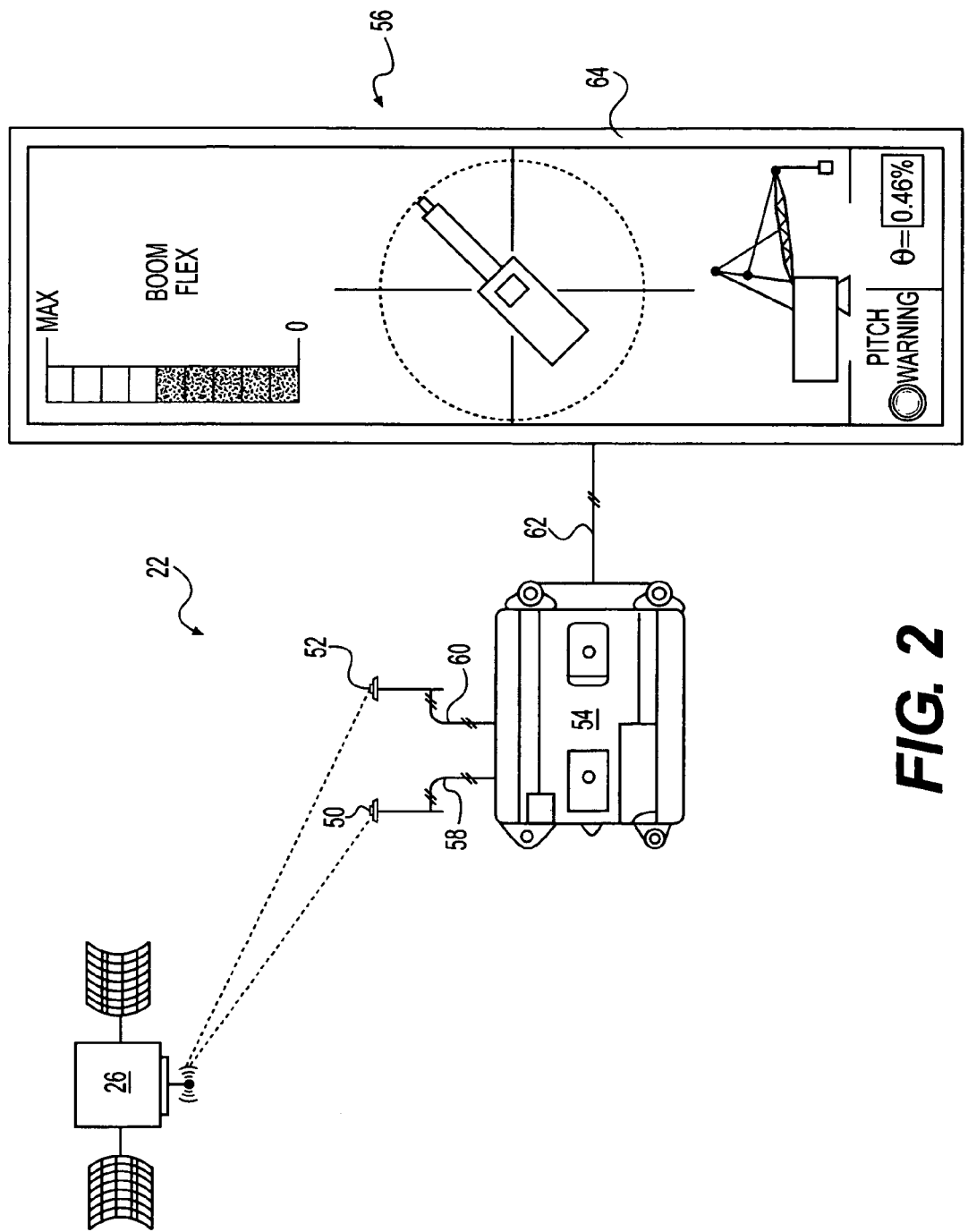
FIG. 2 is schematic illustration of an exemplary disclosed locating system for use with the machine of FIG. 1.

As illustrated in FIG. 2, locating system 22 may include components that interact to determine the location of machine 10. In particular, locating system 22 may include a first GPS unit 50, a second GPS unit 52, a controller 54, and a display system 56. Controller 54 may be in communication with first GPS unit 50, second GPS unit 52, and display system 56 via communication lines 58, 60, and 62, respectively.

First GPS unit 50 may embody an electronic receiver configured to communicate with satellite system 26 to determine a location of itself relative to satellite system 26. In particular, first GPS unit 50 may receive and analyze high-frequency, low power radio signals from multiple satellites 26a, b, c within system 26 to triangulate a 3-D position relative to the different satellites 26a, b, c. A signal indicative of this position may then be communicated from first GPS unit 50 to controller 54 via communication line 58. In one example, first GPS unit 50 may be located on gantry member 16 at a point substantially aligned with axis 28, such as a tip end 63 of gantry member 16. It is contemplated that rather then communicating with satellite system 26, first GPS unit 50 may alternatively communicate with a locally based locating transmitter system, if desired.

Similar to first GPS unit 50, second GPS unit 52 may also embody an electronic receiver configured to communicate with satellite system 26 to triangulate a location of itself relative to satellite system 26. A signal indicative of the position of second GPS unit 52 may then be communicated from second GPS unit 52 to controller 54 via communication line 60. In one example, second GPS unit 52 may be located on tip end 46 of boom 18. It is contemplated that rather then communicating with satellite system 26, second GPS unit 52 may also alternatively communicate with a locally based locating transmitter system, if desired.

Controller 54 may receive the signals from first and second GPS units 50 and 52 and determine positional characteristics of machine 10 in response thereto. For example, based on the signal from first GPS unit 50 and known geometry of gantry member 16, controller 54 may determine the position of body 14. Based on the signals from both first and second GPS units 50, 52, controller 54 may determine a heading and a pitch angle θ of machine 10. In addition, based on the signals from both first and second GPS units 50, 52, and an effective length of cables 40 and 48, controller 54 may determine a location of tool 20. Based on a comparison of the signal from second GPS unit 52 during a loaded operation and an unloaded operation, controller 54 may determine an amount of flexing of boom 18.

Based on these determined positional characteristics, controller 54 may provide recommendations to an operator of machine 10 and/or predictions regarding component life of machine 10. In particular, if controller 54 determines that the determined pitch angle θ of machine 10 exceeds a maximum suggested pitch angle, controller 54 may provide a warning to the operator of machine 10 indicating that repositioning of machine 10 may be required. In addition, controller 54 may compare a load history associated with the determined flexing and load cycling of boom 18 to a suggested replacement interval and provide notice to the operator of machine 10 that a replacement of boom 18 and/or other components of machine 10 may be approaching. Further, controller 54 may be configured to provide real time load information to the operator such that loading of machine 10 may be optimized for efficiency, productivity, and/or safety purposes.

Controller 54 may embody a single microprocessor or multiple microprocessors that include a means for determining the positional characteristics of machine 10. Numerous commercially available microprocessors can be configured to perform the functions of controller 54. It should be appreciated that controller 54 could readily embody a general machine microprocessor capable of controlling numerous machine functions. Controller 54 may include a memory, a secondary storage device, a processor, and any other components for running an application. Various other circuits may be associated with controller 54 such as power supply circuitry, signal conditioning circuitry, solenoid driver circuitry, and other types of circuitry.

Display system 56 may be configured to receive from controller 54 the positional characteristics determined by controller 54 and graphically display the information. In one example, display system 56 may embody a monitor 64 located within operator station 34 (referring to FIG. 1). Monitor 64 may display the 3-D location of machine 10 and/or tool 20 relative to work surface 13, a pitch angle, a pitch angle warning, a boom flex amount, and/or other similar characteristics known in the art.

INDUSTRIAL APPLICABILITY

The disclosed locating system may be applicable to machines having a boom, where knowing the location of the machine, the location of a tool connected to the boom, the heading of the machine, the pitch of the machine, and/or the flexing of the boom, may be important. The disclosed locating system may determine and display this positional information through the use of two GPS units, one of which is located on a tip of the boom. The operation of locating system 22 will now be explained.

As described above, controller 54 may receive signals from first and second GPS units 50 and 52 and determine the position of body 14, a heading of machine 10, a pitch angle θ of machine 10, an amount of flexing of boom 18, and a location of tool 20. For example, controller 54 may receive signals indicative of an $(X_1, Y_1, Z_1)$ location of first GPS unit 50, an $(X_2, Y_2, Z_2)$ location of second GPS unit 52 during an unloaded condition, and an $(X_3, Y_3, Z_3)$ location of second GPS unit 52 during a loaded condition. Controller 54 may then determine a location of body 14 according to the following exemplary equation:

$$L_{Body} = f[(X_1, Y_1, Z_1), \theta, H_{Machine}, G_{Gantry}] \quad \text{Eq. 1}$$

wherein:
$L_{Body}$ is the location of body 14;
$(X_1, Y_1, Z_1)$ is the location of first GPS unit 50;
$\theta$ is the pitch angle of machine 10;
$H_{Machine}$ is the heading of machine 10; and
$G_{Gantry}$ is the known and fixed set of coordinates for a central location of body 14 relative to gantry member 16.

Controller 54 may determine a heading of machine 10 according to the following exemplary equation:

$$H_{Machine} = f[(X_2, Y_2), (X_1, Y_1)] \quad \text{Eq. 2}$$

wherein:
$H_{Machine}$ is the heading of machine 10;
$X_1, Y_1$ is the transverse location of first GPS unit 50 in a horizontal reference plane; and
$X_2, Y_2$ is the transverse location of second GPS unit 52 in the horizontal reference plane.

Controller 54 may determine pitch angle $\theta$ according to the following exemplary equation:

$$\theta = f[(Y_1, Z_1), (Y_2, Z_2)] \quad \text{Eq. 3}$$

wherein:
$\theta$ is the pitch angle of machine 10;
$(Y_1, Z_1)$ is the location of first GPS unit 50 in a vertical reference plane; and
$(Y_2, Z_2)$ is the location of second GPS unit 52 in the vertical reference plane.

Controller 54 may determine the flex of boom 18 according to the following exemplary equation:

$$F_{Boom} = f[(Y_3, Z_3), (Y_2, Z_2)] \quad \text{Eq. 4}$$

wherein:
$F_{Boom}$ is the flex distance of boom 18 measured at tip end 46;
$Y_3, Z_3$ is the loaded location of second GPS unit 52 in a vertical reference plane; and
$Y_2, Z_2$ is the unloaded location of second GPS unit 52 in the vertical reference plane.

Controller 54 may determine the location of tool 20 according to the following exemplary equation:

$$L_{Tool} = f[(X_1, Y_1, Z_1), H_{Machine}, \theta, L_{C40}, L_{C48}] \quad \text{Eq. 5}$$

wherein:
$(X_1, Y_1, Z_1)$ is the location of first GPS unit 50;
$L_{Tool}$ is the location of tool 20 relative to first GPS unit 50;
$H_{Machine}$ is the heading of machine 10;
$\theta$ is the pitch angle of machine 10;
$L_{C40}$ is the effective length of cable 40; and
$L_{C48}$ is the effective length of cable 48.

Once this positional information has been determined by controller 54, the information may be displayed within operator station 34. In particular, controller 54 may communicate this information to monitor 64 via communication line 62. Monitor 64 may then display a location of machine 10 and/or tool 20 within a vertical reference plane and a horizontal reference plane. Monitor 64 may additionally or alternatively display an indication of flexing of boom 18, a pitch angle of machine 10, and/or a pitch warning should the pitch angle of machine 10 exceed a predetermined threshold. Controller 54 may further provide information regarding load history and component life to an operator of machine 10 and/or an off-board system associated machine 10.

The location of first and second GPS units 50, 52 may simplify calculations of positional information, improve reception of information from satellite system 26, and facilitate the determination of load related information. In particular, because first GPS unit 50 is located at vertical axis 28 of machine 10, the calculations required to determine other locations of machine 10 away from first GPS unit 50 may be simple. Also, because of first GPS unit 50 being located on tip end 63 of gantry member 16, the likelihood of gantry member 16 interfering with satellite communication may be low. In addition, because second GPS unit 52 is located on tip end 46 of boom 18, the location of tool 20 connected to the boom 18 may be accurately known, regardless of flexing of boom 18. Further, because second GPS unit 52 is located on boom 18, flexing of boom 18 due to a heavy load may be measured and used for component life prediction and/or efficiency improvement.

It will be apparent to those skilled in the art that various modifications and variations can be made to the disclosed machine locating system. Other embodiments will be apparent to those skilled in the art from consideration of the specification and practice of the disclosed machine locating system. It is intended that the specification and example be considered as exemplary only, with a true scope being indicated by the following claims and their equivalents.

What is claimed is:

1. A locating system for a machine having a boom, the locating system comprising:
a first GPS unit aligned with a vertical axis about which the machine rotates, the first GPS unit being operable to generate a signal indicative of its position at the vertical axis;
a second GPS unit located on the boom; and
a controller in communication with the first GPS unit, the controller being configured to determine a position of the machine by a controller based on input received from only the first GPS unit.

2. The locating system of claim 1, wherein the second GPS unit is located on a tip end of the boom.

3. The locating system of claim 1, wherein the controller is in further communication with the second GPS unit and further configured to determine a heading of the machine based on input received from both the first and second GPS units.

4. The locating system of claim 3, wherein the controller is further configured to determine an amount of flexing of the boom based on input from only the second GPS unit.

5. The locating system of claim 1, wherein the controller is in further communication with the second GPS unit and further configured to determine a pitch of the machine based on input received from both the first and second GPS units.

6. The locating system of claim 1, wherein:
the machine also has a gantry member, a tool and a cable extending from the gantry member over a tip of the boom to the tool; and
the first GPS unit is disposed on the gantry member.

7. A locating system for a machine having a gantry member, a boom, a tool, and a cable extending from the gantry member over a tip end of the boom to the tool, the locating system comprising:
a first GPS unit disposed on the gantry member and substantially aligned with a vertical axis about which the machine rotates, the first GPS unit being operable to generate a signal indicative of its position at the vertical axis;

a second GPS unit mounted to the boom; and a controller configured to determine an amount of flexing of the boom based on input received from only the second GPS unit.

8. The locating system of claim 7, further including a controller in communication with the first GPS unit, the controller configured to determine a position of the machine based on input received from only the first GPS unit.

9. The locating system of claim 8, wherein the controller is in further communication with the second GPS unit and further configured to determine a heading of the machine based on input received from both the first and second GPS units.

10. A method of locating a machine having a boom, the method comprising:

receiving a first signal indicative of a position of the boom;

generating with a GPS unit a second signal indicative of the position of a center of rotation of the machine;

receiving the second signal indicative of a position of the center of rotation of the machine; and determining a position of the machine based on only the second signal from the GPS unit.

11. The method of claim 10, wherein the first signal is indicative of a position of a tip end of the boom.

12. The method of claim 10, wherein the center of rotation is associated with a position of a gantry member.

13. The method of claim 10, further including comparing the first signal received during a loaded condition of the boom and received during an unloaded condition of the boom to determine a flex amount of the boom.

14. The method of claim 10, further including determining a heading of the machine based on the first and second signals.

15. A machine, comprising:

a body having a vertical axis about which the machine rotates;

a boom operatively connected to the body;

a gantry member operatively connected to the body;

a tool;

a cable extending from the gantry member over a tip end of the boom to the tool; and a locating system configured to determine the location of the boom, gantry member, and tool, the locating system including:

a first GPS unit located on the gantry member in alignment with the vertical axis, the first GPS unit being operable to generate a signal indicative of its position at the vertical axis;

a second GPS unit located on the tip end of the boom;

a controller in communication with the first and second GPS units, the controller configured to determine a position, a heading, and a pitch of the machine, and a flex of the boom based on input received from the first and second GPS units, wherein the controller is configured to determine a location of the machine based on input from only the first GPS unit.

16. The locating system of claim 1, wherein a location signal from the first GPS unit remains substantially unchanged during a swing rotation of a body of the machine.

* * * * *